UNITED STATES PATENT OFFICE 2,095,259

MUCINOUS PREPARATIONS

Philip Adolph Kober and Raymond W. Crosley, Chicago, Ill., assignors to G. D. Searle & Co., Chicago, Ill., a corporation of Illinois No Drawing. Application August 3, 1934, Serial No. 738,208

8 Claims. (Cl. 167—56)

Our invention relates to preparations adapted for use in treating diseases of the digestive tract, and more particularly to improved preparations containing mucinous substances of vegetable origin for treatment of ulcerous conditions of the stomach and intestines.

Efforts have been made in the past to protect against these intestinal diseases, which are usually accompanied by hyperacidity conditions, by artificially increasing the antacid properties of the mucus already present in the stomach and other digestive organs. This has been done by the internal administration of gastric mucin derived from the digestive organs of animals.

A method now in use for preparing gastric mucin from the stomach of domestic animals, particularly hogs, comprises the steps of extracting the lining of the stomach with hydrochloric acid, partially neutralizing the extracted portion with a common alkali to reach the iso-electric point of the mucin, precipitating out the mucin with ethyl alcohol, and finally washing with water and treating with alkali to obtain an alkali metal salt of mucin.

The gastric mucin so obtained, when internally administered, exerts a certain amount of antacid effect in the stomach which is beneficial in the treatment of ulcers. However, due to some of the inherent characteristics of the animal matter from which this mucin is obtained, it possesses disadvantages and limitations that have substantially impaired its physiological as well as commercial success.

An improvement over the gastric type mucins has been effected by certain prior art processes in which mucin or mucin-like substances are prepared from vegetable products. In such processes, it is generally customary to extract the mucin content of the plant material with water or other active solvent, the latter being subsequently vaporized by heat treatment. Tests made with such vegetable mucins have shown, however, that their natural curative properties for intestinal diseases, have been somewhat damaged by the means and methods utilized in their preparation.

In order to obviate the many disadvantages of the animal mucins and to produce an improved type of vegetable mucin we have developed a process for obtaining very pure mucinous substances from vegetable materials. This new process is disclosed in detail in our copending application Serial No. 738,209, filed August 3, 1934. It consists essentially in separating mucinous substances from vegetable sources, e. g., mucin-containing seed of *Plantago ovata*, without subjecting them to the action of water or other active solvents. Liquids are used which are inert to the mucinous substances, that is, they do not cause the mucinous substances to swell or dissolve and do not produce physical or chemical changes therein. For this separation we utilize the difference in density that exists between the mucinous substances and the non-mucinous parts of the vegetable products, by treating the latter, after mechanical disintegration, with a comparatively heavy liquid, or mixture of liquids, in which the mucinous parts sink and the non-mucinous parts float. The non-mucinous parts may then be skimmed off and the mucinous parts removed from the liquid, dried and finally pulverized.

Our present invention relates particularly to physiologically active mucinous preparations containing substantial amounts of mucin or mucin-like substances obtained from vegetable sources. This includes, of course, vegetable type mucinous substances prepared by the prior art processes as well as those prepared by the improved process disclosed in our copending application, supra. These mucinous substances, which constitute the principal ingredient of the physiological preparations of our invention, are not chemically the same as gastric mucin. They are essentially carbohydrate in nature rather than being glycoproteins as is the latter. However, they closely resemble gastric mucin in appearance and properties. Their sticky and slimy nature makes them suitable after certain treatments to serve as superior substitutes for the latter. By strict definition these substances are gums or mucilages. However, the term mucilage is rarely used in its scientific sense, but denotes to the popular mind an adhesive of a nature entirely unsuited to the purpose of our invention. Therefore we shall refer to these substances as mucinous to distinguish them from library mucilage, and to point out their close physical resemblance to gastric mucin and their eminent fitness to serve as a substitute therefor.

In accordance with this invention we have discovered that several improvements, particularly as regards the antacid, nutritive, demulcent, and dispersibility characteristics of vegetable type mucinous products may be effected by proper combination of the latter with one or more edible nutritive substances.

These improvements are outlined in the following objects of our invention and are fully disclosed by the subsequent detailed description:

One of the objects of our invention is to provide a vegetable type mucinous preparation that is easily dispersible in liquids and has high demulcent and nutritive values.

Another object of our invention is to produce an improved mucinous preparation suitable for internal administration in the treatment of gastro-intestinal diseases, particularly as an antacid for the correction of hyperacidity of the stomach.

Still another object of our invention is to provide a preparation consisting of mucinous, antacid, and nutritive substances for use as a remedy for gastro-intestinal diseases.

In accordance with our invention we formulate a preparation for use in the treatment of diseases of the gastro-intestinal tract, and particularly for ulcerous diseases thereof, which contains as one of its main constituents a mucinous substance of vegetable origin, mixed with other substances to improve its dispersibility and/or its demulcent, antacid, and nutritive value. We have succeeded in finding a class of substances, each one of which, with the proper formulation, will improve all of the above described characteristics and which at the same time does not detract from the valuable characteristics of vegetable mucinous substances such as pleasant taste and odor, purity as regards parasites and other objectionable ingredients, and cheapness of manufacture.

These improving substances are protein in nature. They are limited to such protein substances as are generally known to be harmless and to be valuable foods, and which are cheaply and easily obtainable in a pure and clean form. In particular we have found it advantageous to use milk solids, and especially the solids from skimmed milk, but we have also obtained good results with other protein substances such as powdered egg white, casein, gelatin, powdered blood proteins, and the like.

In some cases it is desirable to increase one or more of the dispersibility, antacid, demulcent, nutritive, etc., properties of the mucinous substance without changing the other properties, and for this purpose we have discovered by numerous experiments that several classes of substances may be used, other than those already mentioned, and distinctly different in characteristics. For example, we have found that paraffin, mineral oil, kieselguhr, and/or various inert and insoluble substances serve to improve the dispersibility of vegetable mucinous substances without materially increasing their antacid power or their nutritive value, and this may be desirable in some cases.

It has been noted that vegetable mucinous substances, especially when finely ground, do not disperse readily in water. When added to water they have a tendency to form large, slowly soluble lumps. We have been able to render these mucinous substances more easily dispersible by diluting and mixing them with other substances preferably of an insoluble or slowly soluble nature. Such substances when interspersed among the particles of mucinous substances seem to counteract the tendency of the latter to form lumps when moistened. Kieselguhr can be used for this purpose, since it is insoluble and relatively harmless, and has in fact been recommended as a remedy in certain intestinal disorders. A more powerful influence is exerted by substances which are not easily wetted by water such as paraffin or mineral oil. The latter, likewise, do not cause any deleterious results when internally administered.

These inert substances have neither nutritive nor antacid value but they are useful for increasing the dispersibility characteristics. They may be replaced by other substances having either nutritive or antacid value or both as will be discussed hereinafter.

Thus, we have found that starch, lactose, stearic acid, and various other slowly soluble but nutritious substances, either alone or in combination improve the dispersibility and nutritive value of vegetable mucinous substances without materially increasing their antacid power, and this may be desirable in some cases.

Further, we have found that magnesia, chalk, and/or various poorly soluble alkaline substances serve to improve the dispersibility and the antacid power of vegetable mucinous substances without materially increasing their nutritive value, and this may be desirable in some cases. Although these latter classes of substances do not impart to vegetable mucinous substances those optimum properties characteristic of the protein substances mentioned above, they do impart properties which are desirable in treating certain cases of gastro-intestinal diseases.

In connection with the protein substances mentioned above for increasing the physiological value of the mucinous substances in several different respects it is important to note that the possession of antacid power is not an exclusive property of the mucins, but is shared by other proteins. It is commonly held to be a typical property of proteins in general for when any soluble protein is added to a strongly acid solution the hydrogen ion concentration or effective acidity is reduced. As is well known to those skilled in the art, this property may be somewhat modified by judicious treatment of the protein with acid or alkali or other reagents, but it is primarily a property of the natural protein. We have found, for example, that gastric mucin is inferior to milk proteins in antacid power. Whole cow's milk, for example, is a relatively dilute protein solution, and yet ten parts of it are roughly equivalent to one part of commercial gastric mucin in antacid power, although this quantity of milk contains only about one-third as much protein as does one part of gastric mucin. Since gastric mucin is ordinarily administered along with approximately fifteen times its weight of milk, it is apparent that more of the antacid effect comes from the milk than from the mucin, and the mucin is merely supplementary.

In those diseased conditions in which an extremely powerful antacid effect is required, neither gastric mucin nor any of the common articles of food will serve effectively, as pointed out by various investigators, and recourse must be had to the inorganic alkalis. Gastric mucin serves only in cases where a rather mild alkali is required, and then chiefly as a supplement to food.

In the treatment of ulcers of the stomach and upper intestines it is common practice to put the patient on a diet consisting mainly of milk. Milk contains relatively little indigestible residue, and is very apt to produce constipation. This is also true of eggs and of highly refined cereals which are generally given along with milk in the treatment of ulcers. We have found that administration of vegetable mucinous material along with milk and particularly of vegetable mucinous material of the kind produced according to the teaching of our copending application Serial No. 738,209, corrects this fault, by adding soft mucinous bulk which, unlike gastric mucin, retains its demulcent properties throughout the whole alimentary tract, and leads to the formation of large, well formed stools. During the administration of milk as an antacid, a disturbing factor is encountered. This is the coagulation of the milk proteins so that large curds are formed within the stomach. The larger these curds, the more slowly and irregularly do they take up acid, and the more slowly and irregularly does the milk exert its antacid effect. Administration of vegetable mucinous material along with milk leads to the production of smaller curds, and enhances the speed and regularity of the antacid effect.

Thus it is clear that the addition of mucinous substances of vegetable origin to the milk diet as used in ulcer treatment has certain advantages, over and above any specific value of the mucinous substances per se. Clinical tests, which have been made using our improved mucinous preparations, lead us to believe that they have specific beneficial effects, perhaps because of their uronic acid content, or perhaps because of some as yet unknown factor; but we do not wish that the useful properties of our preparations be limited to this or any other theory. The demonstrable advantages of combining mucinous substances derived from vegetable sources with a milk diet in accordance with our invention, are namely, the impartation of demulcent properties, the regulation of the antacid effect, and the correction of the constipating tendency.

For the full realization of the above and certain other advantages we have found it advantageous to apply the vegetable mucinous substances in a particular manner, so that they blend properly with the rest of the diet. This is best accomplished by incorporating them in milk powder, and particularly in skim milk powder, or in other protein substances. The resulting powder is capable of relatively easy dispersion in water, milk, or other liquid. It is capable of doing what the mucinous substances alone cannot do; i. e., it increases the antacid power and the nutritive value of the liquid to which it is added. It is also capable of effecting results which the milk powder alone cannot effect, i. e., it exerts a demulcent effect, leaves non-irritating residual material in the intestines, and regulates antacid action by controlling curd formation. Thus, our mucinous substance and milk powder composition is not only an advantageous substitute for gastric mucin by reason of its possession of all the demonstrable advantages of the latter and lack of certain disadvantages of the latter, but it is also a definite improvement upon gastric mucin because of its superior demulcent and slime forming action, and superior anti-constipating action. Moreover, to obtain the optimum results we have found that the mucinous substance used in the above preparation is preferably of the type produced by the process disclosed in our copending application, supra. The main reason for this, we believe, is that our mucinous substances are obtained in purer form than the other vegetable mucinous substances produced by the prior art active solvent processes.

A form of the composition or preparation of our invention which we have found to give good results, consists of substantially equal parts of skim milk powder and vegetable origin mucinous substances. This powder composition is dispersible in water or other liquid, is prepossessing in appearance, and has a pleasant taste and odor. When one part of this composition is dispersed in ten parts of milk, the antacid power, and the nutritive value, with the exception of the fat, are increased about fifty percent over the milk alone, without materially increasing the volume which must be consumed. The composition is clean and pure, and is free of parasites and objectionable substances.

The examples which are given below serve to illustrate the practice of our invention. It is evident that many variations are possible, especially when it is desired to modify some of the features of this invention so as to fit it for certain special cases. The protein substances mentioned may be replaced or supplemented by the addition of inert substances, alkalis, and various other medicaments. In special cases it may be desirable to reduce either the nutritive value or the antacid power of the composition, and in some cases it may be advisable to increase these functions somewhat; consequently, various modifications of the formulae are possible. The examples are intended only to illustrate the invention and not to limit it in any manner.

*Example I*

This example illustrates the preparation of a composition for treating diseases of the digestive tract by combining skim milk powder with previously purified mucinous parts of the seeds of *Linum usitatissimum*. It also illustrates a method of preparing such compositions from mucinous substances which occur in the form of coarse particles and which are difficult to grind; and this method is generally applicable to such substances. When the mucinous parts have been separated from the seeds of *Linum usitatissimum* by methods other than water extraction they commonly occur as tough flexible scales which are difficult to grind. Therefore, it is advisable to use a special procedure for preparing useful products from these and other tough mucinous substances.

A satisfactory formula comprises fifty parts of the purified mucinous substances and fifty parts of skim milk powder. These ingredients are mixed and then moistened with such quantity of water as causes the mixture to agglomerate into lumps. Ordinarily twenty parts more or less water is a sufficient amount. The lumpy mass thus formed is granulated in a simple manner by rubbing it through a sieve. It is then rapidly dried at a low temperature in a current of air. The dried mass may be pulverized with relative ease. The resulting product is a brownish gray powder, which disperses readily in water or other liquids producing a considerable volume of slimy, mucinous paste. Clinical tests have shown this product to be useful in treating ulcerous conditions of the alimentary tract.

*Example II*

This example illustrates the preparation of a composition for treating diseases of the digestive tract which comprises combining skim milk powder with the purified mucinous parts of the seeds of *Plantago ovata* and/or similar seeds. A satisfactory formula comprises fifty parts of the purified mucinous substance and fifty parts of skim milk powder. The mucinous substance is first ground to a suitable fineness. We prefer that it shall be so ground that about two-thirds more or less will pass through a screen of 80 meshes to the linear inch. It is then mixed with the skim milk powder and the resulting composition is a light colored powder of pleasing odor and taste. It disperses readily in water or milk to form a suspension, which at first is sufficiently liquid to be drunk with ease, but which soon thickens to form a semi-solid slimy mass. The proper method of administration is to swallow it quickly while it is still liquid, so that it can mix thoroughly with the stomach contents. This composition has given very pleasing results in clinical tests.

*Example III*

This example illustrates the preparation of a composition for treating diseases of the digestive tract which comprises combining powdered egg albumen with the purified mucinous parts of the seeds of *Plantago ovata* and/or similar seeds. A preferred formula comprises forty parts of the purified mucinous substances and sixty parts of powdered egg albumen. It is desirable that the mucinous substance shall be so ground that most of it will pass a screen of 60 meshes to the linear inch. After screening, the mucinous powder is then mixed with the powdered egg albumen. The resulting composition is a light colored powder without objectionable odor or taste and which soon forms a semi-solid slimy mass when suspended in water.

*Example IV*

This example illustrates the preparation of a composition for treating diseases of the digestive tract which comprises combining the purified mucinous parts of the seeds of *Plantago ovata* and/or similar seeds with skim milk powder and alkalis. It illustrates the subordination of nutritive value to antacid power which is made possible by changing the basic formula. A satisfactory formula comprises sixty parts of the purified mucinous substance, twenty parts of skim milk powder, twenty parts heavy magnesia, and twenty parts precipitated chalk. The resulting composition is a light colored powder of mild odor and taste. It disperses readily in water to form a suspension which at first is fluid, but which gradually becomes semi-solid and slimy.

The mucinous substances contained in the above described preparations may be of any purified vegetable type, but are advantageously of the type described in our copending application, supra, for as mentioned hereinbefore and as fully disclosed in that application, the latter type of mucinous substances are of exceedingly pure form and possess unusual physiological properties which inure to the benefit of the products of our present invention.

It is to be understood that the general description and specific examples given hereinabove are for purposes of illustration only and are subject to various modifications and substitutions, the scope of which is to be limited only by the prior art and appended claims.

What we claim is:

1. A refined palatable dry physiologically active composition of matter suitable for alleviating ulcerous conditions of the digestive tract comprising a relatively large amount of purified vegetable mucinous material from which substantially all of the fiber, cellulose, and other ulcer irritating detritus has been removed, and at least 20% of protein material which possesses pronounced nutritive, antacid and demulcent properties, intimately admixed with said mucinous material, to supply any deficiency of these properties in said mucinous material for the treatment of said ulcerous conditions.

2. A refined palatable dry physiologically active composition of matter suitable for alleviating ulcerous conditions of the digestive tract comprising a relatively large amount of purified mucinous content of seeds of *Plantago ovata* from which substantially all of the fiber, cellulose, and other ulcer irritating detritus has been removed, and at least 20% of protein material which possesses pronounced nutritive, antacid and demulcent properties, intimately admixed with said mucinous material, to supply any deficiency of these properties in said mucinous material for the treatment of said ulcerous conditions.

3. A dry composition of matter adapted for treatment of the digestive tract comprising a quantity of milk solids mixed with a relatively large amount of a vegetable mucinous substance substantially free from fiber, cellulose, and other irritating detritus and having substantially the same physical and chemical characteristics as the original mucinous substances present in the plant material from which it was obtained.

4. A dry mucinous preparation comprising a relatively large amount of a vegetable mucinous powder substantially free from fiber, cellulose, and other irritating detritus mixed with powdered milk solids.

5. A dry composition of matter comprising approximately equal parts of a vegetable mucinous powder and skim milk powder substantially free from fiber, cellulose, and other irritating detritus.

6. A dry physiologically active mucinous preperation comprising approximately equal parts of mucinous substances obtained from seeds of *Plantago ovata* and substantially free from fiber, cellulose, and other irritating detritus mixed with milk solids.

7. A dry composition of matter comprising approximately equal parts of a mucinous substance obtained from the seeds of *Linum usitatissimum* and substantially free from fiber, cellulose, and other irritating detritus, and a milk powder.

8. A dry composition of matter comprising approximately forty parts of a substantially pure vegetable mucinous substance substantially free from fiber, cellulose, and other irritating detritus and sixty parts of powdered egg albumen.

PHILIP ADOLPH KOBER.
RAYMOND W. CROSLEY.